US011281395B2

(12) United States Patent
Maezawa et al.

(10) Patent No.: US 11,281,395 B2
(45) Date of Patent: Mar. 22, 2022

(54) INFORMATION PROCESSING DEVICE, BACKUP METHOD, RESTORE METHOD, AND PROGRAM

(71) Applicant: Mitsubishi Electric Corporation, Tokyo (JP)

(72) Inventors: Yusuke Maezawa, Tokyo (JP); Takuya Miyamaru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/414,949

(22) PCT Filed: Feb. 1, 2019

(86) PCT No.: PCT/JP2019/003581
§ 371 (c)(1),
(2) Date: Jun. 17, 2021

(87) PCT Pub. No.: WO2020/157950
PCT Pub. Date: Aug. 6, 2020

(65) Prior Publication Data
US 2022/0043576 A1 Feb. 10, 2022

(51) Int. Cl.
*G06F 12/00* (2006.01)
*G06F 3/06* (2006.01)
*G06F 9/455* (2018.01)

(52) U.S. Cl.
CPC ............ *G06F 3/065* (2013.01); *G06F 3/0619* (2013.01); *G06F 3/0664* (2013.01); *G06F 3/0683* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

2012/0331248 A1 12/2012 Kono et al.
2014/0149701 A1 5/2014 Osada et al.
(Continued)

FOREIGN PATENT DOCUMENTS

| JP | 2000-35920 A | 2/2000 |
| JP | 2002-49534 A | 2/2002 |
| JP | 2013-156873 A | 8/2013 |

(Continued)

OTHER PUBLICATIONS

International Search Report and Written Opinion dated Apr. 23, 2019, received for PCT Application PCT/JP2019/003581, Filed on Feb. 1, 2019, 12 pages including English Translation.
(Continued)

*Primary Examiner* — Daniel D Tsui
(74) *Attorney, Agent, or Firm* — Xsensus LLP

(57) ABSTRACT

An information processing device includes a master virtual machine and at least one slave virtual machine. The master virtual machine includes a file collector to collect a file in the at least one slave virtual machine, an archive creator to create an archive file of the collected file and store the archive file into the master virtual machine, and a master backup unit to create an image file of the master virtual machine including the archive file of the collected file and back up the image file into an external storage.

11 Claims, 11 Drawing Sheets

(56) References Cited

U.S. PATENT DOCUMENTS

2015/0081993 A1\* 3/2015 Christopher ........ G06F 11/1451
   711/162
2017/0004081 A1 1/2017 Hayakawa et al.

FOREIGN PATENT DOCUMENTS

| JP | 2014-44630 A | 3/2014 |
| JP | 2015-204025 A | 11/2015 |
| WO | 2012/176307 A1 | 12/2012 |
| WO | 2013/030967 A1 | 3/2013 |
| WO | 2015/132941 A1 | 9/2015 |

OTHER PUBLICATIONS

Vmware, Inc., "Virtual Machine Backup Guide: ESX Server 3.5, ESX Server 3i Version 3.5, Virtual Center 2.5. Update 2 Release", Available Online At: URL: https://www.vmware.com/files/jp/pdf/vi3_35_25_u2_vm_backup_ja.pdf, Jul. 25, 2008, 100 pages including English Translation.

Notice of Reasons dated Mar. 31, 2020, received for JP Application 2020-512906, 5 pages including English Translation.

Decision to Grant dated Aug. 11, 2020, received for JP Application 2020-512906, 5 pages including English Translation.

\* cited by examiner

INFORMATION PROCESSING DEVICE, BACKUP METHOD, RESTORE METHOD, AND PROGRAM

CROSS-REFERENCE TO RELATED APPLICATION

The present application is based on PCT filing PCT/JP2019/003581, filed Feb. 1, 2019, the entire contents of which are incorporated herein by reference.

TECHNICAL FIELD

The present disclosure relates to an information processing device, a backup method, a restore method, and a program.

BACKGROUND ART

An information processing device that creates a virtual environment may include multiple virtual machines operable simultaneously in cooperation with one another.

In factory automation, for example, one virtual machine that implements a real-time operating system (OS) and a control application, and another virtual machine that implements a non-real-time OS and an information processing application may operate in cooperation with each other.

The information processing device that creates a virtual environment includes a storage such as a hard disk drive, and may back up data stored in the storage onto an external storage to protect the data against a possible crash.

Such multiple virtual machines (guest OSs) operate on a host OS. Patent Literature 1 describes a host OS including a backup unit for backing up virtual machines. The host OS recognizes the virtual machines as a set of files including a virtual hard disk (VHD), and backs up the virtual machines with the backup unit backing up these files for implementing the virtual machines. For a stable operation of the virtual machines, the host OS may limit functions. For example, a host OS in a known information processing device may be dedicated to virtual machine management and may have limited access from a user. Such an information processing device may have the virtual machines with backup capabilities.

CITATION LIST

Patent Literature

Patent Literature 1: Unexamined Japanese Patent Application Publication No. 2013-156873

SUMMARY OF INVENTION

Technical Problem

However, virtual machines including backup units do not recognize one another as a set of VHD files and cannot perform backup. More specifically, an information processing device with the host OS without a backup unit is unlikely to appropriately back up the multiple virtual machines included in the system.

In response to the above issue, an objective of the present disclosure is to provide an information processing device including multiple virtual machines that cooperate with one another in backing up the virtual machines.

Solution to Problem

To achieve the above objective, an information processing device according to an aspect of the present disclosure includes at least one first virtual machine and a second virtual machine. The second virtual machine includes a file collector to collect a file in the at least one first virtual machine, an archive creator to create an archive file of the collected file and store the archive file into the second virtual machine, and a backup unit to create an image file of the second virtual machine including the archive file and back up the image file into an external storage.

Advantageous Effects of Invention

The information processing device according to the above aspect of the present disclosure includes multiple virtual machines that cooperate with one another in backing up the virtual machines.

DESCRIPTION OF EMBODIMENTS

An information processing device, a backup method, a restore method, and a program according to one or more embodiments of the present disclosure will now be described in detail with reference to the drawings.

Embodiment 1

Figure 1:
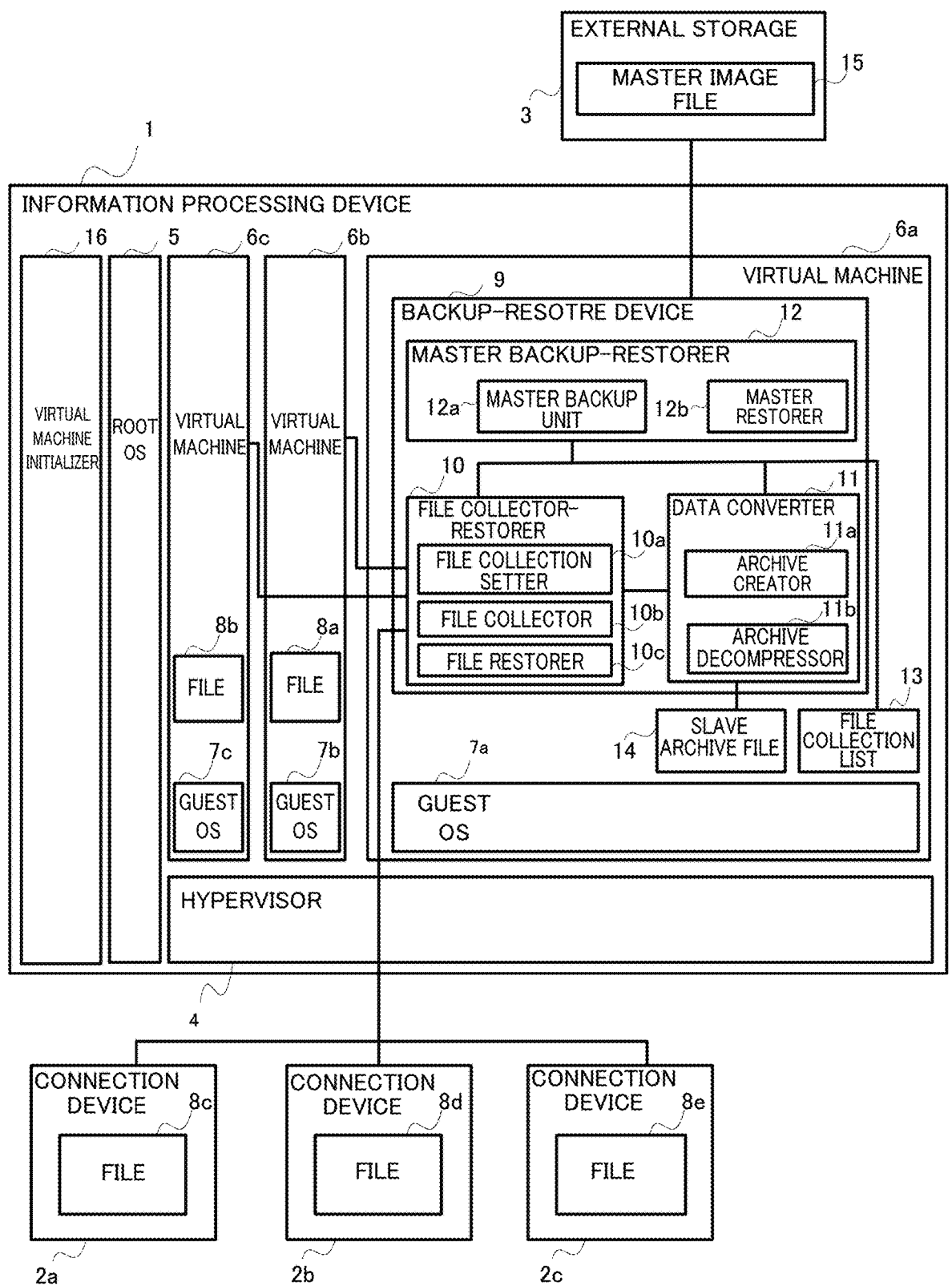
FIG. 1 is a functional diagram of an information processing device according to Embodiment 1 of the present disclosure.

FIG. 1 is a block diagram of an information processing device 1 according to an embodiment of the present disclosure.

The information processing device 1 is an industrial computer that controls factory automation (FA) devices, such as production machines, sensors, and drivers, at a production site and collects data from the FA devices for various analyses.

The information processing device 1 is connected to multiple connection devices 2a, 2b, and 2c. The connection devices 2a, 2b, and 2c each include a programmable logic controller (PLC) that controls a target device, such as an assembly robot. The information processing device 1 transmits information indicating a data transmission request and control information to the connection devices 2a, 2b, and 2c. The connection devices 2a, 2b, and 2c then transmit various items of information such as data acquired by a sensor and requested data. Although the three connection devices 2a, 2b, and 2c are connected in the example shown FIG. 1, any number of devices may be connected.

The information processing device 1 is also connected to an external storage 3, such as a hard disk drive or a tape device, for storing backup data.

The information processing device 1 creates a virtual environment in which multiple virtual computers operate on a physical computer. The information processing device 1 includes a hypervisor 4 and a root operating system (OS) 5 that manages the hypervisor 4. The hypervisor 4 runs multiple virtual machines 6a, 6b, and 6c. Guest OSs 7a, 7b, and 7c respectively operate on the virtual machines 6a, 6b, and 6c. The guest OSs 7b and 7c respectively have files 8a and 8b containing, for example, application programs and user data.

The hypervisor 4 is a software program for implementing multiple virtual machines. The hypervisor 4 allocates resources such as processing capabilities of a central processing unit (CPU) and storage areas in a random-access memory (RAM) and a hard disk drive to the virtual machines 6a, 6b, and 6c.

The root OS 5 activates and manages the hypervisor 4, and is equivalent to a host OS. The root OS 5 is a real-time OS with high real-time responsiveness.

The virtual machines 6a, 6b, and 6c are virtualized computers that operate on the hypervisor 4. Each of the virtual machines 6a, 6b, and 6c behaves like hardware of a single computer.

The guest OSs 7a, 7b, and 7c are respectively installed in the virtual machines 6a, 6b, and 6c to operate in the virtual machines 6a, 6b, and 6c. The guest OSs 7a, 7b, and 7c are highly responsive real-time OSs that perform real-time control over FA devices or non-real-time general-purpose OSs incorporating various application programs. The virtual machines 6a, 6b, and 6c include a real-time OS or a general-purpose OS as the guest OSs 7a, 7b, and 7c.

A guest OS as a real-time OS includes files containing, for example, a software program for controlling FA devices, a software program for collecting data from the FA devices, a software program for diagnosing the collected data, a software program for setting parameters of the FA devices, the collected data, and data representing the results of the data diagnosis.

A guest OS as a general-purpose OS includes files containing, for example, a software program for examining or analyzing data collected from the FA devices and data representing the results of the examination or analysis.

These software programs are executed on the guest OSs 7a, 7b, and 7c to perform processes.

The virtual machine 6a includes a backup-restore device 9, unlike the other virtual machines 6b and 6c. As described later, the backup-restore device 9 backs up and restores the files containing software programs and data in the virtual machines 6b and 6c to and from the external storage 3. The virtual machine 6a with the backup-restore device 9 operates as a master. The virtual machines 6b and 6c to be backed up and restored serve as slaves. The virtual machine 6a may operate on a general-purpose OS. General-purpose OSs may have various drivers and easily establish an interface with the external storage 3. The virtual machine 6a including the backup-restore device 9 may benefit when operating on a general-purpose OS. In contrast, the virtual machines 6b and 6c operate on real-time OSs. Real-time OSs may have fewer drivers and may involve a dedicated design without an interface for connection to the external storage 3. The virtual machines 6b and 6c with such a structure can be backed up through the virtual machine 6a. The virtual machines 6b and 6c each are an example of a first virtual machine. The virtual machine 6a is an example of a second virtual machine. In the present embodiment, although two virtual machines 6b and 6c serve as slaves, any number of virtual machines serves as slaves in other examples.

The backup-restore device 9 includes a file collector-restorer 10 that collects files stored in the slave virtual machines 6b and 6c and restores files into the slave virtual machines 6b and 6c, a data converter 11 that converts the files collected from the virtual machines 6b and 6c to archive files and decompresses the archive files, and a master backup-restorer 12 that backs up image files and restores the backed up image files.

An archive file is a set of files. An image file is data in a storage that is filed without any change in the file and folder structures.

The file collector-restorer 10 includes a file collection setter 10a that creates a list of files to be collected from the slave virtual machines 6b and 6c, a file collector 10b that collects files from the slave virtual machines 6b and 6c based on the list, and a file restorer 10c that restores the files into the virtual machines 6b and 6c.

The file collection setter 10a specifies backup target files from the files stored in the slave virtual machines 6b and 6c and creates a file collection list 13 that lists the specified backup target files. The file collection setter 10a further specifies files to be backed up from the files stored in the connection devices 2a, 2b, and 2c and creates a file collection list 13. Before creating the file collection list 13, the file collection setter 10a displays a selection screen for the user to select files for backup.

The file collector 10b accesses, based on the created file collection list 13, the slave virtual machines 6b and 6c and the connection devices 2a, 2b, and 2c to collect backup target files from each of the virtual machines and collection devices. The file collector 10b further instructs the data converter 11 to convert the collected files into archive files for each of the virtual machines 6b and 6c and the connection devices 2a, 2b, and 2c.

The file restorer 10c restores the collected files into the virtual machines 6b and 6c and the connection devices 2a, 2b, and 2c.

The data converter 11 includes an archive creator 11a that creates an archive file of collected files and an archive decompressor 11b that decompresses the archive file.

The archive creator 11a converts the files collected by the file collector 10b into archive files for each of the virtual machines 6b and 6c and the connection devices 2a, 2b, and 2c and creates a slave archive file 14. The archive creator 11a stores the created slave archive file 14 into a storage area in the master virtual machine 6a.

The archive decompressor 11b decompresses the slave archive file 14 read by the file restorer 10c.

The master backup-restorer 12 includes a master backup unit 12a that backs up the image file of the master virtual machine 6a and a master restorer 12b that restores the backed up image file of the virtual machine 6a. The master backup unit 12a is an example of a backup unit in the claims, and the master restorer 12b is an example of a restorer in the claims.

The master backup unit 12a converts the entire data in the virtual machine 6a into an image file to create a master image file 15, and stores the master image file 15 as a backup file into the external storage 3.

The master restorer 12b reads and decompresses the master image file 15 as a backup file stored in the external storage 3 and restores the master image file 15 into the virtual machine 6a.

The backup-restore device 9 creates the file collection list 13, the slave archive file 14, and the master image file 15 during the backup process.

The file collection list 13 is created by the file collection setter 10a and lists backup target files selected from the files included in the slave virtual machines 6b and 6c and the connection devices 2a, 2b, and 2c. The file collection list 13 is stored into the storage area in the master virtual machine 6a.

The slave archive file 14 results from the data converter 11 converting the files included in the slave virtual machines 6b and 6c and the connection devices 2a, 2b, and 2c into archive files. The slave archive file 14 is stored into the storage area in the master virtual machine 6a.

The master image file 15 contains the entire data stored in the storage area in the master virtual machine 6a, including the slave archive file 14. The master image file 15 is stored into the external storage 3.

A virtual machine initializer 16 initializes the information processing device 1 to the factory default. Once initialized, the information processing device 1 is restored to the state in which the virtual machines 6a, 6b, and 6c include the guest OSs 7a, 7b, and 7c. The master virtual machine 6a is restored to include the backup-restore device 9 in addition to the guest OS 7a.

Figure 2:
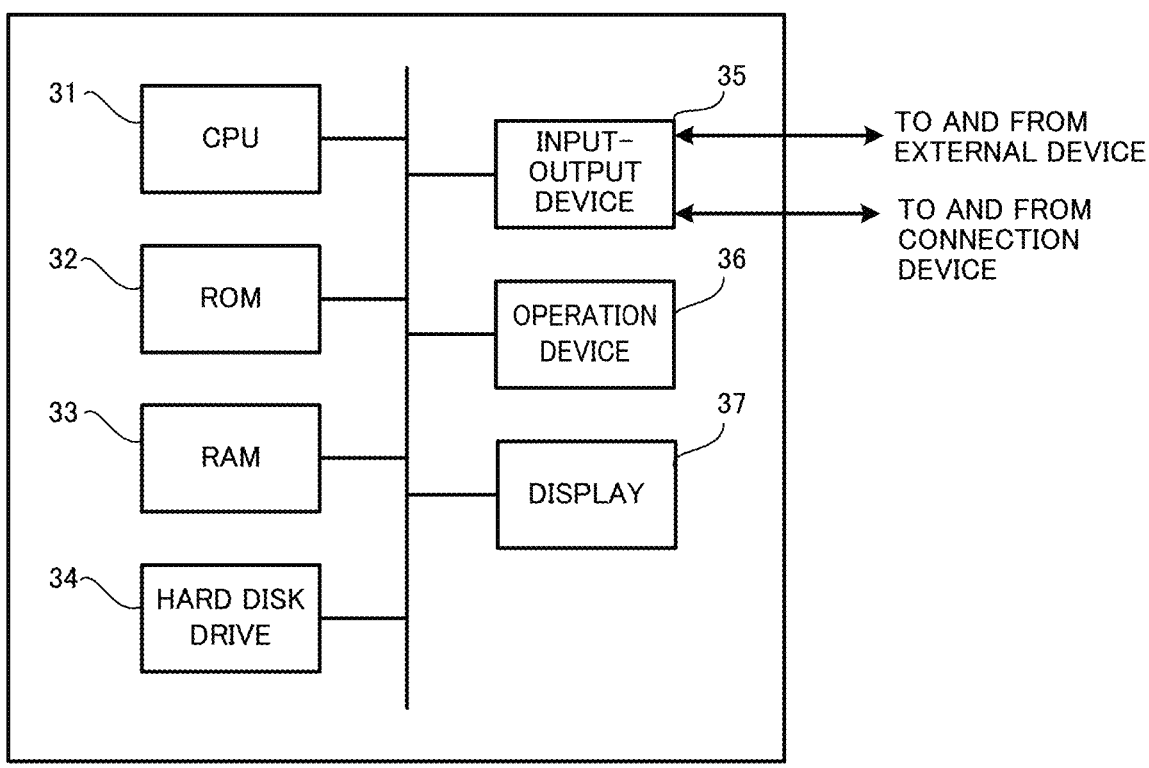
FIG. 2 is a hardware diagram of the information processing device in FIG. 1.

FIG. 2 is a hardware diagram of the information processing device 1.

The information processing device 1 includes a CPU 31 that performs control processing, a read-only memory (ROM) 32 that stores programs and data, a RAM 33 that temporarily stores programs and data, a hard disk drive 34 with a large storage capacity, an input-output device 35 that performs transmission and reception to and from an external device, an operation device 36 that receives input operations, and a display 37 that displays images. The components of the information processing device 1 are interconnected with a bus.

The CPU 31 controls the overall operation of the information processing device 1. The CPU 31 operates in accordance with a program stored in the ROM 32 and uses the RAM 33 as a work area. The ROM 32 stores a program and data for controlling the overall operation of the information processing device 1. The RAM 33 serves as a work area for the CPU 31. In other words, the CPU 31 temporarily writes the program and data to the RAM 33 and uses the program and the data as appropriate.

The hard disk drive 34 is a non-volatile storage that stores information. The hard disk drive 34 stores a virtual machine program, the OS, various application programs, and data.

The input-output device 35 is an input-output interface that transmits and receives data to and from the external storage 3 and the connection devices 2a, 2b, and 2c.

The operation device 36 is operable by a user to input various instructions into the CPU 31. The operation device 36 includes, for example, a keyboard and a mouse.

The display 37 displays, for example, screens showing the results of processes and operation screens.

The operation of the information processing device 1 with the above structure will now be described.

The information processing device 1 transmits a control program executable by the connection devices 2a, 2b, and 2c to the connection devices 2a, 2b, and 2c. The connection devices 2a, 2b, and 2c control the target devices by executing the control program. The information processing device 1 requests data about the target devices from the connection devices 2a, 2b, and 2c. The connection devices 2a, 2b, and 2c collect data. The collected data is transmitted to the information processing device 1.

The device control and data collection are performed by the virtual machine 6a, 6b, or 6c that incorporates a real-time OS. The collected data is analyzed by the virtual machine 6a, 6b, or 6c that incorporates a general-purpose OS.

A backup process performed by the information processing device 1 will now be described.

The backup process is performed by the backup-restore device 9 in the master virtual machine 6a in response to addition, modification, or deletion of a file or a user instruction, or is performed periodically. The backup process includes two stages. The first stage includes collecting the files 8a and 8b from the slave virtual machines 6b and 6c and files 8c, 8d, and 8e from the connection devices 2a, 2b, and 2c to create archive files and storing the archive files into the storage area in the master virtual machine 6a. The second stage includes storing the image file of the master virtual machine 6a into the external storage 3.

Before the files in the slave virtual machines 6b and 6c and the connection devices 2a, 2b, and 2c are collected in the first stage, a list is created to specify the files to be collected.

The user first invokes the file collection setter 10a in the file collector-restorer 10 in the backup-restore device 9 to specify backup target files. The user selects, with the file collection setter 10a, files to be backed up from the files 8a, 8b, 8c, 8d, and 8e in the slave virtual machines 6b and 6c and the connection devices 2a, 2b, and 2c to create the file collection list 13 listing the files to be backed up.

In response to the file collection setter 10a being invoked, the display 37 displays a selection screen for selecting a file to be backed up on the screen.

The user first selects a virtual machine or a connection device with a file to be backed up from the slave virtual machines 6b and 6c in the information processing device 1, excluding the master virtual machine 6a, and the connection devices 2a, 2b, and 2c connected to the information processing device 1.

In response to selection of a virtual machine or a connection device, the file collection setter 10a accesses the selected virtual machine or connection device and reads the file structure information about the selected virtual machine or connection device. The read file structure information appears on the display 37 as a selection screen. This file structure information is presented for the user to select a file for backup.

Figure 3:
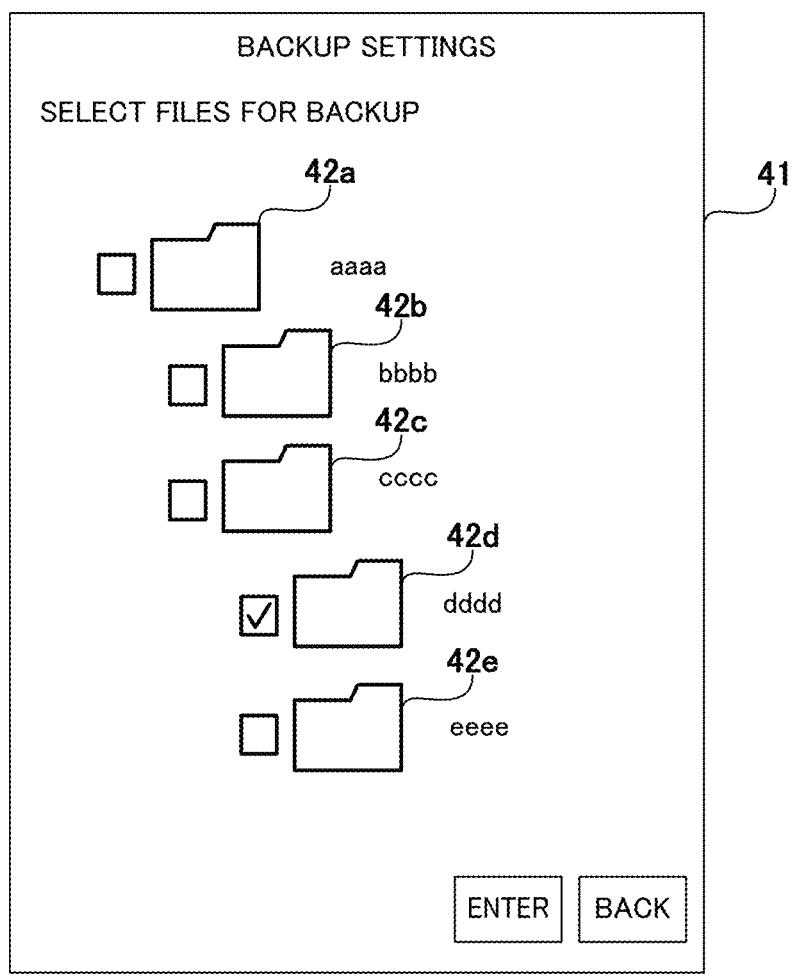
FIG. 3 is a diagram of an example selection screen for creating a file collection list with a file collection setter in FIG. 1.

FIG. 3 shows an example selection screen 41 for selecting a backup target file.

The selection screen 41 displays the file structure in the selected virtual machine or connection device in a hierarchy. The file names appear on the right of the file icons. In FIG. 3, a file 42a at the top appears with the file name aaaa. The file 42a with the file name aaaa has lower level files 42b and 42c appearing with file names bbbb and cccc. The file 42c has lower level files 42d and 42e appearing with file names dddd and eeee. Checkboxes appear on the left of the file icons. The user checks the checkbox of the file to be backed up to select a backup target file.

Examples of files include application programs created by the user, data files created by the user with an application program, application programs customized by the user, and an OS setting information file.

The user selects at least one of these files created or modified by the user as a backup target file. For an embedded OS with fewer user-configurable settings, user-modifiable data is limited. In this case, files unmodified by the user may be excluded from the backup targets to reduce the backup size, thus allowing the storage to save storage capacity for backup.

The selection screen 41 may exclude, from selection options, files unlikely to have any setting changes, as well as the OS, application programs, and various items of data that are recoverable to the factory default for the information processing device 1 with a recovery process. The selection screen 41 may eliminate these files from the screen, or display these files without checkboxes to exclude the files from the selection options.

Files previously backed up and remaining unchanged may appear on the selection screen 41 with an indication of being unmodified, or may be eliminated from the screen. Files are determined as modified or unmodified based on whether, for example, the file date or the file size remains the same.

A user, for example, selecting the file 42a by checking the checkbox for the file 42a also selects the lower level files 42b to 42e. Similarly, a user selecting the file 42c by checking the checkbox for the file 42c also selects the lower level files 42d and 42e. As shown in FIG. 3, to select the file 42d alone, the user checks the checkbox for file 42d.

After selecting the file, the user presses the enter button to enter the selection.

The user continues to select another virtual machine or connection device for which backup target files have yet to be selected, and performs file selection in the same manner as above.

After the user selects backup target files for all the slave virtual machines 6b and 6c and the connection devices 2a, 2b, and 2c, the user selection process for creating the file collection list 13 ends.

The file collection setter 10a creates the file collection list 13 based on the user selection.

Figure 4:
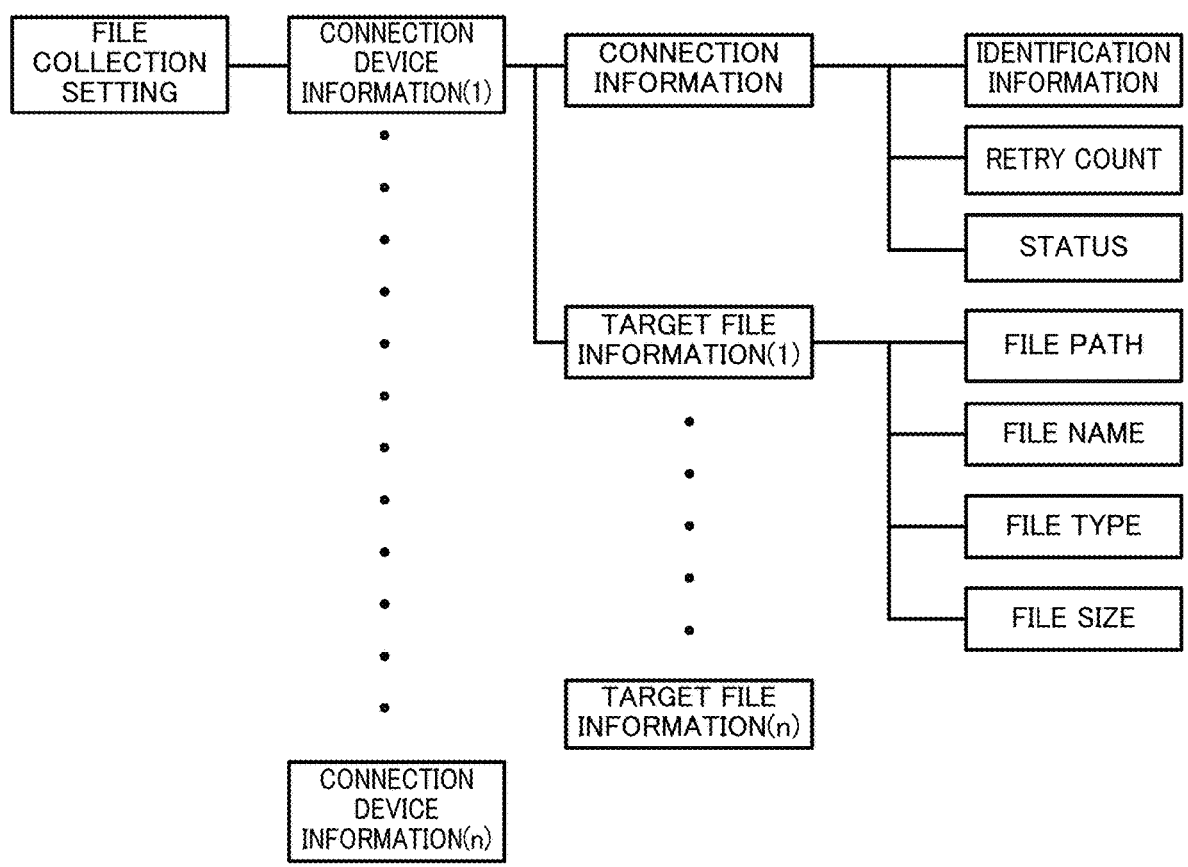
FIG. 4 is a diagram of an example file collection list created through selection on the selection screen in FIG. 3.

FIG. 4 shows the structure of the created file collection list 13.

Connection device information sets 1 to n indicate the slave virtual machines 6b and 6c and the connection devices 2a, 2b, and 2c connected to the information processing device 1. Although the connection device information sets can be generated as many as the slave virtual machines 6b and 6c and the connection devices 2a, 2b, and 2c connected to the information processing device 1, no connection device information set is generated for slave virtual machines and connection devices unselected by the user for backup and for connection devices without any files.

Each connection device information set includes connection information and target file structure information.

The connection information includes identification information about the slave virtual machine 6b or 6c or the connection device 2a, 2b, or 2c, a retry count to access the slave virtual machine 6b or 6c or the connection device 2a, 2b, or 2c, and status information. For file collection, the target slave virtual machine 6b or 6c or the connection device 2a, 2b, or 2c are accessed based on the identification information. The retry count records the number of retries preformed to achieve access. The status information records whether the access is complete.

The target file structure information is about the file for backup intended by the user among the files contained in the target slave virtual machine 6b or 6c or the connection device 2a, 2b, or 2c.

The target file information includes the file path, file name, file type, and file size of the target file.

In response to the file collection list 13 being created, the display 37 displays a permission screen for performing file collection. The user presses a run button on the screen to instruct the file collector-restorer 10 to perform file collection.

Figure 5:
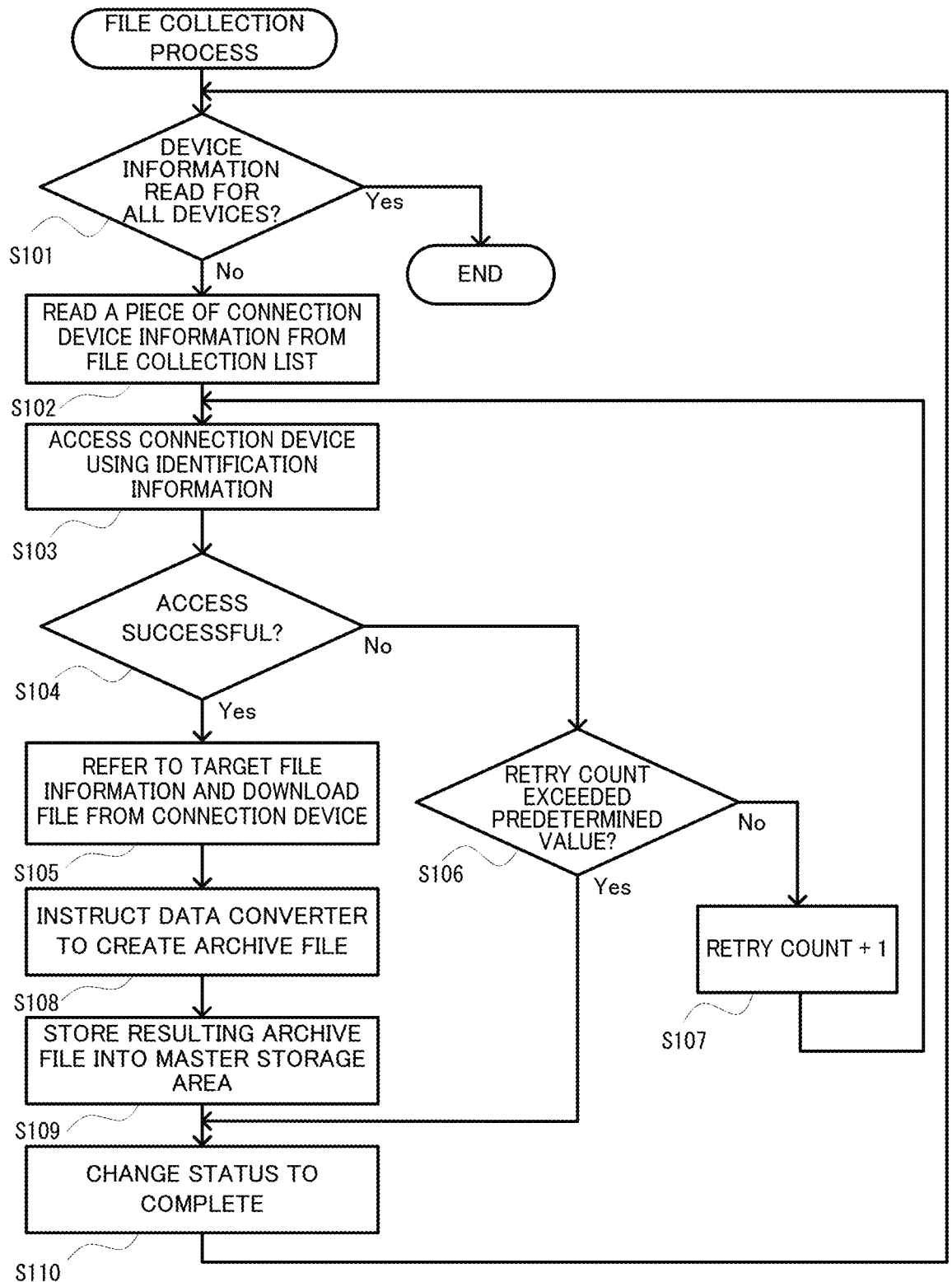
FIG. 5 is a flowchart showing a file collection process performed by a file collector in FIG. 1.

The file collector 10b in the file collector-restorer 10 refers to the file collection list 13 and collects the files 8a and 8b to be backed up and restored from the slave virtual machines 6b and 6c in accordance with the flowchart shown in FIG. 5. For the file collection list 13 listing the connection devices 2a, 2b, and 2c, the files 8c, 8d, and 8e to be backed up and restored are also collected from the connection devices 2a, 2b, and 2c.

The file collector 10b first determines whether the device information has been read for all the slave virtual machines 6b and 6c and the connection devices 2a, 2b, and 2c to be backed up (step S101).

At the beginning, the file collector 10b has not accessed any device and read no device information (No in step S101). Thus, the file collector 10b reads a piece of connection device information from the file collection list 13 (step S102).

The file collector 10b reads the connection information from the read connection device information and uses the identification information in the connection information to access the slave virtual machine 6b or 6c or the connection device 2a, 2b or 2c (step S103).

Upon success of the access (Yes in step S104), the file collector 10b refers to target file information in the connection device information and downloads the backup target file (step S105).

Upon failure (No in step S104), the file collector 10b determines whether the retry count to access the target slave virtual machine 6b or 6c or connection device 2a, 2b, or 2c exceeds a predetermine value (step S106).

In response to the retry count being within the predetermined value (No in step S106), the file collector 10b increments the retry count by 1 (step S107) and returns to step S103 to repeat the access.

After downloading the target file, the file collector 10b instructs the data converter 11 to create an archive file for the slave virtual machine 6b or 6c or the connection device 2a, 2b or 2c from the downloaded file (step S108). In response to the file creation instruction, the archive creator 11a in the data converter 11 compresses the target file of the target slave virtual machine 6b or 6c or the connection device 2a, 2b, or 2c to convert the file into an archive file, thus creating the slave archive file 14. The created slave archive file 14 is stored into the storage area in the master virtual machine 6a (step S109). In response to completion of the storage, the status in the connection information is changed to complete (step S110). In response to the retry count to access a slave virtual machine or a connection device exceeding the predetermined value (Yes in step S106), the status is also changed to complete (step S110).

After completing the backup of the slave virtual machine 6b or 6c or the connection device 2a, 2b, or 2c, the file collector 10b checks whether any other slave virtual machine 6b or 6c or connection device 2a, 2b, or 2c remains to be backed up (step S101). In response to any machine or device remaining to be backed up, the file collector 10b repeats the processing from step S102 to step S110 described above. In response to no other slave virtual machine 6b or 6c or connection device 2a, 2b, or 2c remaining to be backed up (Yes in step S101), the file collector 10b ends the process.

The slave archive file 14 is created for each of accessed virtual machines 6b and 6c and connection devices 2a, 2b, and 2c, and stored into the storage area in the master virtual machine 6a.

In response to completion of the file collection process, the display 37 indicates that the file collection is complete. The user finds that the slave archive files 14 are created for all the target slave virtual machines 6b and 6c and the connection devices 2a, 2b, and 2c through the display screen.

The display screen displays a permission screen for performing the backup of the image file of the master virtual machine 6a. The user presses the run button on the screen to instruct the master backup-restorer 12 to perform a master backup process.

In response to the user instruction to the master backup-restorer 12 to perform backup, the master backup unit 12a in the master backup-restorer 12 starts the master backup process to back up the image file of the master virtual machine 6a.

Figure 6:
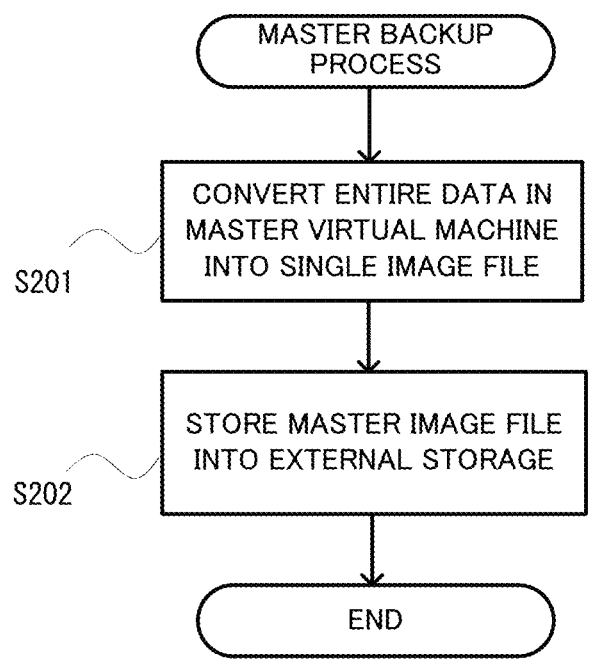
FIG. 6 is a flowchart showing a master backup process performed by a master backup unit in FIG. 1.

As shown in FIG. 6, the master backup unit 12a converts the entire data in the master virtual machine 6a into a single image file to create the master image file 15 (step S201). The master image file 15 includes the data stored in the storage area in the master virtual machine 6a. More specifically, the master image file 15 includes the file collection list 13 and the slave archive files 14 containing the files collected by the file collector-restorer 10 and converted into the archive files by the data converter 11. The master image file 15 converted to an image file is stored into the external storage 3 (step S202). This ends the master backup process.

The backup destination may be a backup area in the hard disk drive 34, instead of the external storage 3. The backup destination may be specified by the user within the master backup-restorer 12.

The master backup-restorer 12 providing a common function of backing up and restoring the image file of the virtual machine 6a may be a restore tool included in the operating system or commercially available backup-restore software.

The backup process is complete. The data in the virtual machine 6a for backup excludes the guest OS 7a and the backup-restore device 9. The information processing device 1 backs up the files in the virtual machines alone and supplementarily restores the shared parts with the virtual machine initializer 16 that provides an initializing function included in the product.

The backup process described above collects backup target files from the slave virtual machines 6b and 6c and the connection devices 2a, 2b, and 2c and stores the collected files as slave archive files 14 into the storage area in the master virtual machine 6a to integrate the files into the master virtual machine 6a. The master backup-restorer 12 backs up the entire virtual environment of the master alone into the external storage 3. Thus, the multiple virtual machines included in the information processing device cooperate with one another in backing up the virtual machines.

The backup target is the master virtual environment. The image size is thus smaller than for backing up all the drives. The backup target can be in a single image file, thus eliminating the image file management or backup separately performed for each virtual environment. This also saves time for backup.

To perform backup from all the drives, each boot drive is to be booted to activate a backup-restore program. Virtual environments do not allow direct browsing of the drives in other virtual environments. Thus, accessing all the drives involves booting from different drives. In this case, each virtual environment is to be stopped and cannot continue the processing, thus decreasing availability.

In contrast, the guest OS 7a of the master virtual machine 6a performing the backup process does not stop any virtual machine, thus preventing a decrease in availability.

A restore process will now be described.

The restore process includes restoring the backed up data after initializing the information processing device 1 to the factory default. After the initialization, the master image file 15 stored in the external storage 3 is decompressed to restore the image file of the master virtual machine 6a. After the master virtual machine 6a is restored, the slave archive files 14 are decompressed to restore the slave virtual machines 6b and 6c and the connection devices 2a, 2b, and 2c.

The process of initializing the information processing device 1 to the factory default will first be described.

The user initializes the information processing device 1 to the factory default with the virtual machine initializer 16 included in the information processing device 1. After being initialized, the information processing device 1 is restored to the state in which the virtual machines 6a, 6b, and 6c include the guest OSs 7a, 7b, and 7c. The master virtual machine 6a is further restored to include the backup-restore device 9 on the guest OS 7a.

The hard disk drive 34 in the information processing device 1 has a recovery area that stores a recovery program for initializing the information processing device 1 to the factory default. The recovery program may be stored in the ROM 32 in the information processing device 1, the external storage 3, or in a non-transitory portable recording medium such as a compact disc read-only memory (CD-ROM) and a digital versatile disc read-only memory (DVD-ROM).

In response to the information processing device 1 being powered on, the information processing device 1 reads a Basic Input/Output System (BIOS) from the ROM 32 and executes the BIOS. While the BIOS is operating, a screen for setting the device to be activated appears in response to a key input operation performed by the user. On the setting screen, the user sets the hard disk drive 34 storing the recovery program as a device to be activated. In response to the setting, the recovery program in the recovery area in the hard disk drive 34 is read to activate the virtual machine initializer 16.

The external storage 3, a non-transitory portable recording medium, or the recovery area in the hard disk drive 34 stores the image file containing data stored in the hard disk drive 34 at the factory default. The image file includes the root OS, hypervisor, guest OSs, backup-restore program, device drivers, application programs, and various items of data. The virtual machine initializer 16 installs the above image file and restores the information processing device 1 to the factory default.

Once the information processing device 1 is restored to the factory default, each virtual machine incorporates, for example, the guest OS and the application program. The master virtual machine 6a further incorporates the backup-restore device 9.

After initializing the information processing device 1, the user reactivates the information processing device 1. The information processing device 1 executes the BIOS, reads the OS from the hard disk drive 34, and loads the OS into the RAM 33 to activate the OS. The user activates the backup-restore device 9 in the master virtual machine 6a to restore the virtual machines 6a, 6b, and 6c and the connection devices 2a, 2b, and 2c. Reactivating the information processing device 1 may automatically activate the backup-restore device 9.

The user specifies the master image file 15 stored in the external storage 3 as a restore source and instructs the master backup-restorer 12 in the backup-restore device 9 to restore the master image file 15. Upon receiving the restore instruction, the master restorer 12b in the master backup-restorer 12 starts a master restore process to restore the master image file 15.

Figure 7:
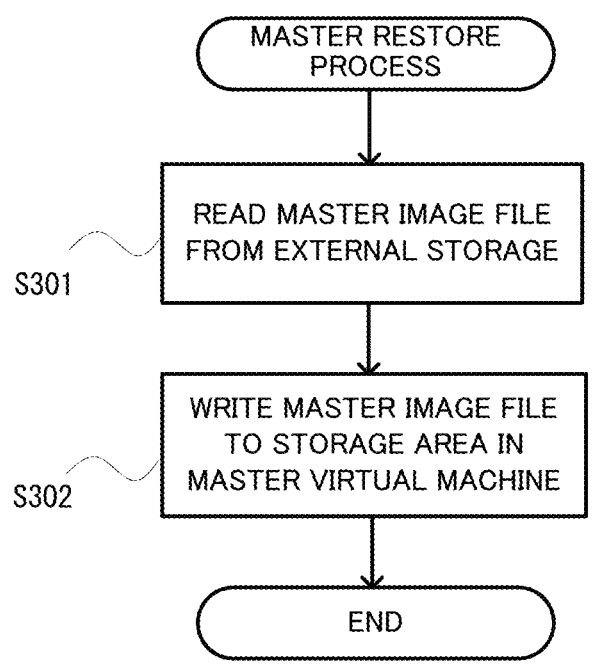
FIG. 7 is a flowchart showing a master restore process performed by a master restorer in FIG. 1.

As shown in FIG. 7, the master restorer 12b reads the master image file 15 from the external storage 3 (step S301). The master restorer 12b writes the read master image file 15 to the storage area in the master virtual machine 6a, and restores the data about the virtual machine 6a (step S302). After being restored, the master virtual machine 6a includes the data about the master virtual machine 6a, the slave archive files 14, and the file collection list 13.

In response to completion of the master restore process, the display 37 indicates that the restore of the master virtual machine 6a is complete. The user then finds that the master virtual machine 6a has been restored.

The display screen displays a permission screen for performing the restore of the slave virtual machines 6b and 6c and the connection devices 2a, 2b, and 2c. The user presses the run button on the screen to instruct the file collector-restorer 10 to perform a slave restore process.

Figure 8:
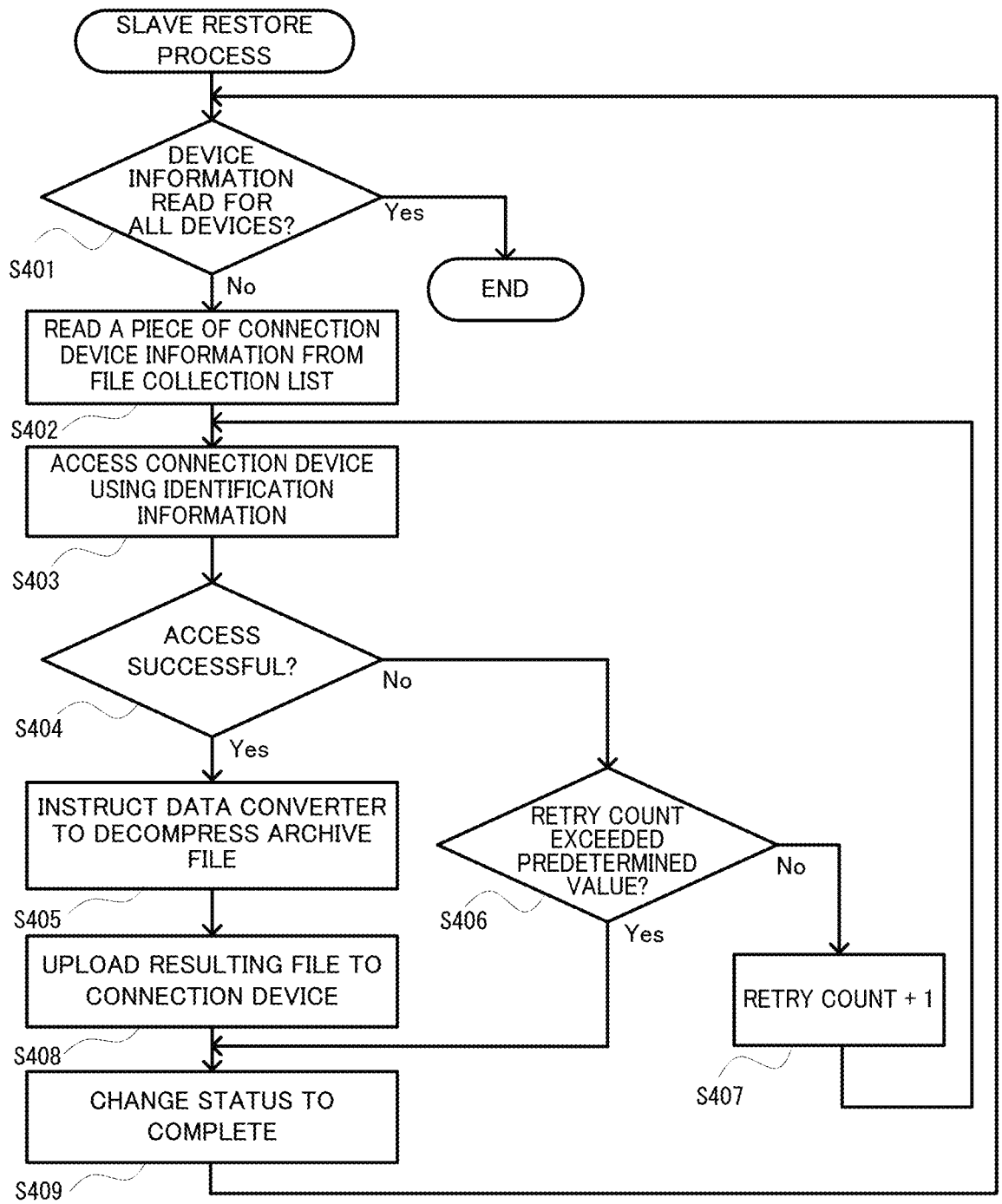
FIG. 8 is a flowchart showing a slave restore process performed by a file restorer in FIG. 1.

The file restorer 10c in the file collector-restorer 10 performs the slave restore process in accordance with the flowchart shown in FIG. 8.

The file restorer 10c decompress the slave archive files 14 with the data converter 11 to convert the slave archive files 14 to a state restorable into the slave.

The file restorer 10c uploads, in accordance with the file collection list 13, the files resulting from decompression of the slave archive files 14 to the slave virtual machines 6b and 6c and the connection devices 2a, 2b, and 2c.

The file restorer 10c first determines whether the device information has been read for all the virtual machines 6b and 6c and the connection devices 2a, 2b, and 2c to be restored (step S401).

At the beginning, the file restorer 10c has not accessed any device and has read no device information (No in step S401). Thus, the file restorer 10c reads a piece of connection device information from the file collection list 13 (step S402).

The file restorer 10c reads the connection information from the read connection device information and uses the identification information in the connection information to access the slave virtual machine 6b or 6c or the connection devices 2a, 2b or 2c (step S403).

Upon success of the access (Yes in step S404), the file restorer 10c refers to the file collection list 13 and instructs the archive decompressor 11b in the data converter 11 to decompress the downloaded slave archive file 14 of the slave virtual machine 6b or 6c or connection device 2a, 2b, or 2c (step S405).

Upon failure (No in step S404), the file restorer 10c determines whether the retry count to access the target slave virtual machine 6b or 6c or connection device 2a, 2b, or 2c exceeds a predetermined value (step S406).

In response to the retry count within the predetermined value (No in step S406), the file restorer 10c increments the retry count by 1 (step S407) and returns to step S403 to repeat the access.

Upon receiving a decompression instruction for the slave archive file 14 in step S405, the archive decompressor 11b decompresses the slave archive file 14 of the target slave virtual machine 6b or 6c or connection device 2a, 2b, or 2c stored in the storage area in the master in accordance with the decompression instruction. The file restorer 10c uploads the decompressed file to the target slave virtual machine 6b or 6c or connection device 2a, 2b, or 2c (step S408). In response to completion of the upload, the status in the connection information is changed to complete (step S409). In response to the retry count to access the slave virtual machine 6b or 6c or the connection device 2a, 2b, or 2c exceeds the predetermined value (Yes in step S406), the status is also changed to complete (step S409).

After completing the restore of one of the slave virtual machines 6b and 6c and the connection devices 2a, 2b, and 2c, the file restorer 10c checks whether any other slave virtual machine 6b or 6c or connection device 2a, 2b, or 2c remains to be restored (step S401). In response to any machine or device remaining to be restored, the file restorer 10c repeats the processing from step S402 to step S409 described above. In response to no other slave virtual machine 6b or 6c or connection device 2a, 2b, or 2c remaining to be restored (Yes in step S401), the file restorer 10c ends the slave restore process.

In the present embodiment, the master restorer 12b restores the virtual environment of the master virtual machine 6a from the master image file 15 in the external storage 3. After the virtual environment of the master virtual machine 6a is restored, the slave archive files 14 are restored into the storage area in the master virtual machine 6a and decompressed with the archive decompressor 11b. The file restorer 10c restores the decompressed files into the target virtual machines 6b and 6c and the connection devices 2a, 2b, and 2c.

The master image file 15 alone is stored into the external storage 3. This eliminates the image file management or backup and restore separately for each virtual environment.

The files of the connected connection devices can also be backed up and restored, facilitating backup and restore of the entire device and the entire product line.

Embodiment 2

In Embodiment 1, backup target files are collected based on the file collection list 13 created by the user selecting the files to be backed up from the slave virtual machines 6b and 6c and the connection devices 2a, 2b, and 2c.

In the present embodiment to be described below, another backup is performed for files added, updated, or deleted after the file backup described above. With a backup process already performed before, new backup data is created based on the difference from the previous backup data.

The backup according to the present embodiment is performed every time a file is, for example, added or updated, or is periodically. The backup may also be performed automatically.

Figure 9:
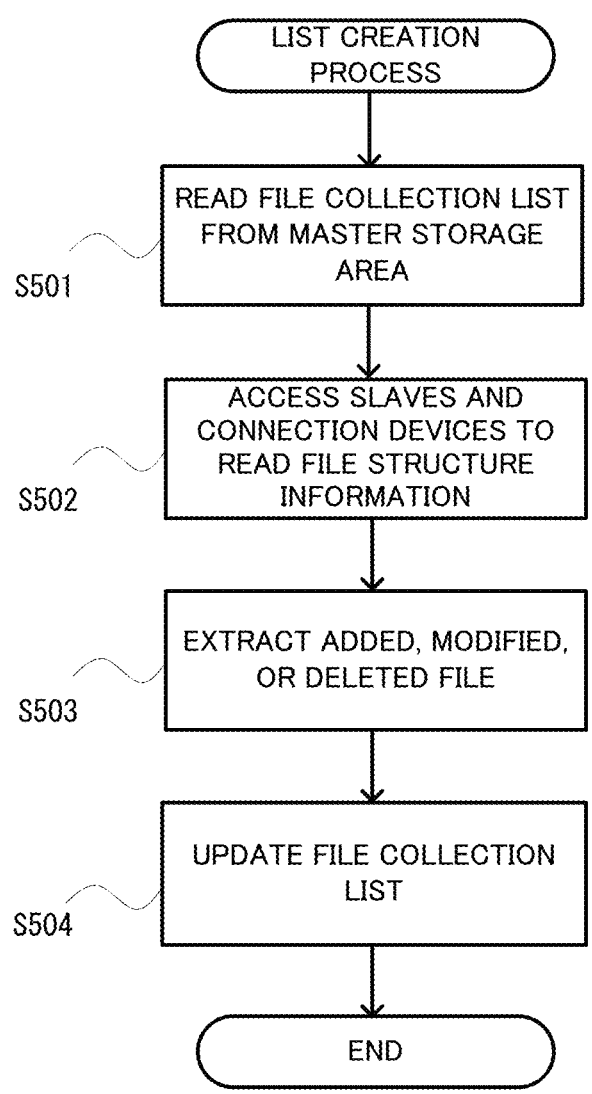
FIG. 9 is a flowchart showing a list creation process performed by a file collection setter included in an information processing device according to Embodiment 2 of the present disclosure.

A list creation process for creating a file collection list 13 listing files to be collected from the slave virtual machines 6b and 6c and the connection devices 2a, 2b, and 2c will first be described with reference to FIG. 9.

The file collection setter 10a first reads the previously created file collection list 13 from the storage area in the master virtual machine 6a (step S501). The file collection setter 10a then accesses the slave virtual machines 6b and 6c and the connection devices 2a, 2b, and 2c to read the file structure information (step S502). The file collection setter 10a then compares the previously created file collection list 13 with the read file structure information to extract newly added, modified, or deleted files (step S503).

A file is determined to be added, modified, or deleted based on, for example, the file path name, file update date, and file size.

Any file with a new file path name is determined as an added file. Any file with the same file path name but with a different file update date or a different file size is determined as a modified file. Any file without a file path name is determined as a deleted file.

The file collection list 13 created in Embodiment 1 is a list created by the user selecting the files to be backed up. Thus, a file previously determined not to be backed up and unselected may be recognized as a newly added file. To avoid this, a list of files unselected for the file collection list 13 is created. The list prevents the files on the list from being recognized as added files during file extraction.

The file update date may also be used to determine whether a file is newly added. A file with an update date before the creation date of the previous file collection list 13 is determined to be not newly added this time.

In response to extraction of a newly added, modified, or deleted file, the previously created file collection list 13 is updated to create a new file collection list 13 (step S504).

A separate list for the files added, modified, or deleted may be created without updating the file collection list 13.

Figure 10:
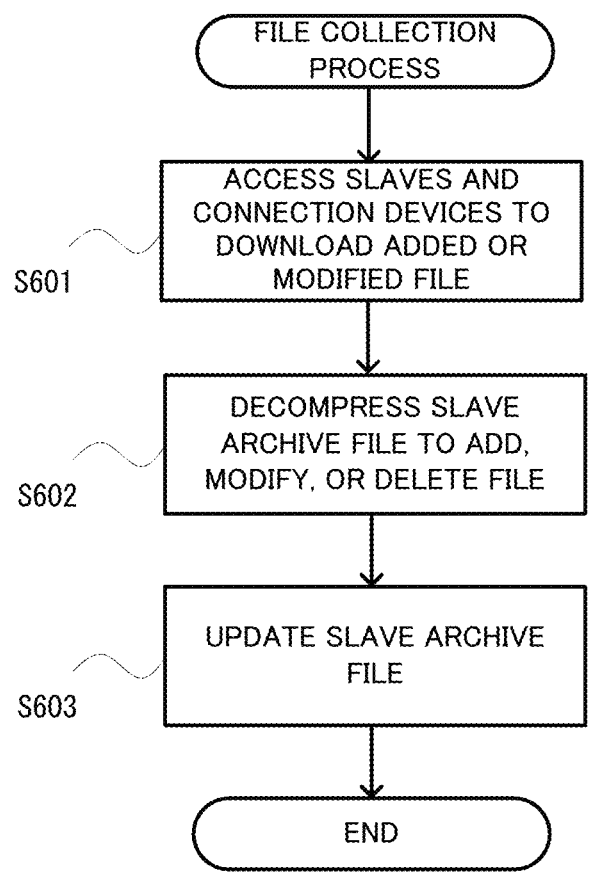
FIG. 10 is a flowchart showing a file collection process performed by a file collector included in the information processing device according to Embodiment 2 of the present disclosure.

In response to the new file collection list 13 being created, the file collector 10b in the file collector-restorer 10 collects the added or modified files based on the new file collection list 13. This file collection process is described with reference to FIG. 10.

The file collector 10b first accesses the target slave virtual machines 6b and 6c and the connection devices 2a, 2b, and 2c based on the file collection list 13 and downloads an added or modified file (step S601). The file collector 10b then decompresses, with the data converter 11, the previously created slave archive file 14 stored in the storage area in the master virtual machine 6a. The downloaded added-file is added to the file set resulting from decompression of the slave archive file 14, and the downloaded modified file replaces the file yet to be modified in the file set. A file to be deleted is deleted from the file set resulting from the decompression of the slave archive file 14 (step S602).

In response to completion of the file addition, modification, and deletion, an archive creator 11a converts the files from each of the slave virtual machines and the connection devices into an archive file and creates an updated slave archive file 14 (step S603). The created slave archive file 14 is stored into the storage area in the master virtual machine 6a.

In response to the update of the slave archive file 14, a master backup unit 12a in a master backup-restorer 12 converts the entire data including the slave archive file 14 into a single image file to create an updated master image file 15. The created master image file is stored into the external storage 3.

A separate archive file may be created for the newly added or modified file without updating the slave archive file 14 by replacing the files with newly added, modified, or deleted files.

In the manner described above, a newly added, modified, or deleted file may be backed up.

Embodiment 3

In the above embodiment, a new backup file is created with comparison between the file collection list 13 and the file structure information read through access to the slave virtual machines 6b and 6c and the connection devices 2a, 2b, and 2c.

In another embodiment, the file structure information read through access to the slave virtual machines 6b and 6c and the connection devices 2a, 2b, and 2c may be compared with the file structure information about the slave virtual machines 6b and 6c and the connection devices 2a, 2b, and 2c in the initialized information processing device 1 to extract an added, modified, or deleted file for creation of a backup file.

In this embodiment, the file collection setter 10a reads and prestores the file structure information about the slave virtual machines 6b and 6c and the connection devices 2a, 2b, and 2c in the initialized information processing device 1.

Figure 11:
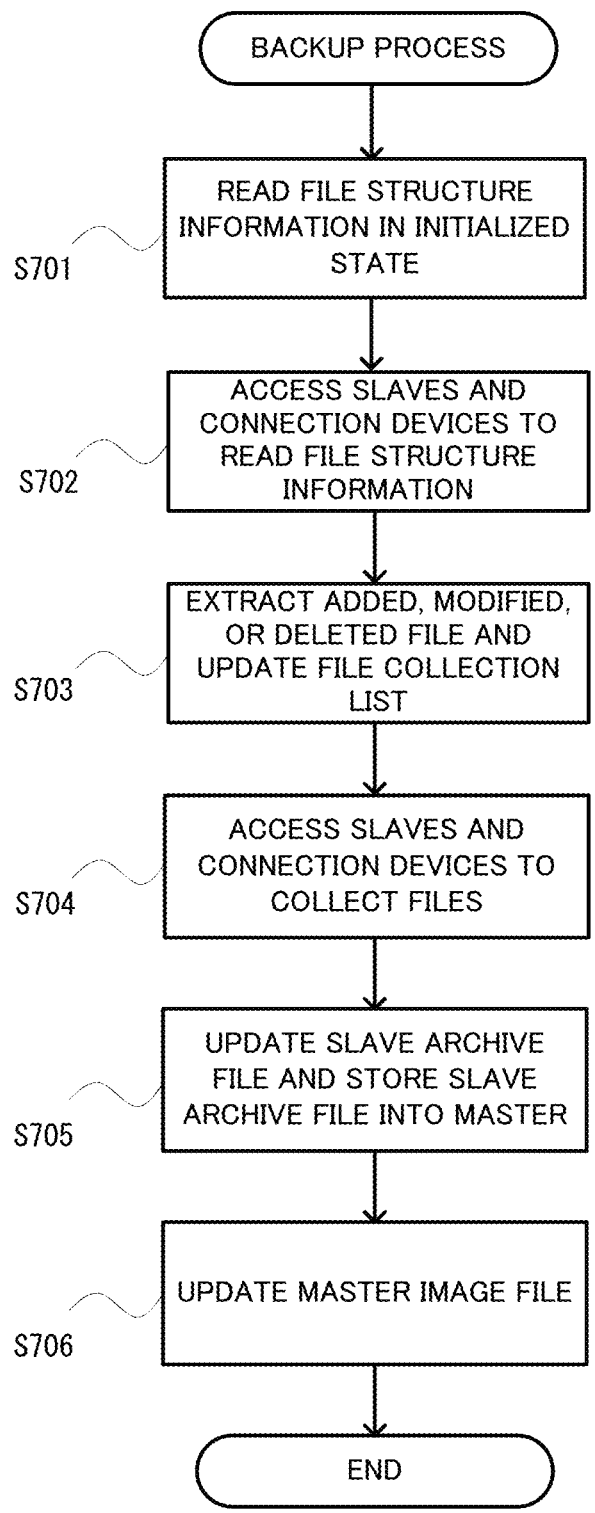
FIG. 11 is a flowchart showing a backup process performed by an information processing device according to Embodiment 3 of the present disclosure.

The backup process is performed in response to a file being added, modified, or deleted, or a user instruction, or is performed periodically. As shown in FIG. 11, the file collection setter 10a first reads the prestored file structure information in the initialized state (step S701). The file collection setter 10a then accesses the slave virtual machines 6b and 6c and the connection devices 2a, 2b, and 2c to read the file structure information (step S702).

The file collection setter 10a then compares the read file structure information with the file structure information in the initialized state to extract an added, modified, or deleted file to create a file collection list 13 (step S703).

A file is determined to be added, modified, or deleted based on, for example, the file path name, file update date, and file size.

In response to the update of the file collection list 13, the file collector 10b accesses the slave virtual machines 6b and 6c and the connection devices 2a, 2b, and 2c based on the updated file collection list 13 and collects files (step S704). The collected files are converted into archive files by the data converter 11 as slave archive files 14. The updated slave archive files 14 are stored into the storage area in the master virtual machine 6a (step S705).

In response to the update of the slave archive files 14, the master backup unit 12a in the master backup-restorer 12 converts the entire data in the master virtual machine 6a into a single image file to update the master image file 15 (step S706).

The structure in the embodiment described above may eliminate the procedure of decompressing the previously-created slave archive file 14 and adding, modifying, or deleting files to create a new slave archive file 14 in Embodiment 2.

In one or more embodiments of the present disclosure, the processes performed by the file collector 10b, the archive creator 11a, the master backup unit 12a, the master restorer 12b, the archive decompressor 11b, and the file restorer 10c may be programmed. The program may be stored in, for example, a non-transitory computer-readable recording medium, such as a CD-ROM and a DVD-ROM, for distribution. The program may be installed in a computer to provide a computer that implements the processes described above. For example, to implement the processes by sharing between an OS and an application or with an OS and an application in cooperation, the application alone may be stored in a non-transitory recording medium.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The structure according to one or more embodiments of the present disclosure may be incorporated in various information processing devices that use virtual machines.

REFERENCE SIGNS LIST

1 Information processing device
2a, 2b, 2c Connection device
3 External storage
4 Hypervisor
5 Root OS
6a, 6b, 6c Virtual machine
7a, 7b, 7c Guest OS
8a, 8b, 8c, 8d, 8e, 42a, 42b, 42c, 42d, 42e File
9 Backup-restore device
10 File collector-restorer
10a File collection setter
10b File collector
10c File restorer
11 Data converter
11a Archive creator
11b Archive decompressor
12 Master backup-restorer
12a Master backup unit
12b Master restorer
13 File collection list
14 Slave archive file
15 Master image file
16 Virtual machine initializer
31 CPU
32 ROM
33 RAM
34 Hard disk drive
35 Input-output device
36 Operation device
37 Display
41 Selection screen

The invention claimed is:

1. An information processing device comprising:
at least one first virtual machine; and
a second virtual machine, wherein
the second virtual machine includes
a file collector to collect a file in the at least one first virtual machine,
an archive creator to create an archive file of the collected file and store the archive file into the second virtual machine, and
a backup unit to create an image file of the second virtual machine including the archive file and back up the image file into an external storage.

2. The information processing device according to claim 1, wherein
the at least one first virtual machine includes one or more first virtual machines, and
the archive creator converts the collected file into the archive file for each of the one or more first virtual machines.

3. The information processing device according to claim 1, wherein
the second virtual machine further includes a file collection setter to specify a collection target file to be collected from files in the at least one first virtual machine excluding a file associated with an operating system, and
the backup unit creates the image file of the second virtual machine including a list of the specified collection target file.

4. The information processing device according to claim 1, wherein
the file collector collects a file in a connection device connected to the information processing device.

5. The information processing device according to claim 1, wherein
the second virtual machine includes
a restorer to restore the image file of the second virtual machine backed up by the backup unit,
an archive decompressor to decompress the archive file created by the archive creator, and
a file restorer to upload the file resulting from the decompression of the archive file to the at least one first virtual machine.

6. The information processing device according to claim 5, further comprising:
a virtual machine initializer to restore the at least one first virtual machine and the second virtual machine to an initialized state.

7. The information processing device according to claim 5, wherein
the archive decompressor decompresses, based on a list of a collection target file included in the image file of the second virtual machine, the archive file, and the file restorer uploads the file resulting from the decompression to the at least one first virtual machine.

8. A backup method executable by an information processing device, the backup method comprising:
collecting a file specified in a first virtual machine;
creating an archive file of the collected file and storing the archive file into a second virtual machine; and
backing up an image file of the second virtual machine including the archive file of the collected file.

9. A restore method executable by an information processing device, the restore method comprising:
restoring an image file of a second virtual machine storing an archive file of a file in a first virtual machine;
decompressing the archive file of the file in the first virtual machine; and
uploading the file resulting from the decompression to the first virtual machine.

10. A non-transitory computer-readable recording medium storing a program, the program causing a computer to perform operations comprising:
collecting a file specified in a first virtual machine;
creating an archive file of the collected file and storing the archive file into a second virtual machine; and
backing up an image file of the second virtual machine including the archive file of the collected file.

11. A non-transitory computer-readable recording medium storing a program, the program causing a computer to perform operations comprising:
    restoring an image file of a second virtual machine storing an archive file of a file in a first virtual machine;
    decompressing the archive file of the file in the first virtual machine; and
    uploading the file resulting from the decompression to the first virtual machine.

* * * * *